(12) United States Patent
Preteseille et al.

(10) Patent No.: US 9,420,538 B2
(45) Date of Patent: Aug. 16, 2016

(54) LIMITED SERVICE STATE CONTROL

(71) Applicant: ST-Ericsson SA, Plan-les-Ouates (CH)

(72) Inventors: Erwan Preteseille, Arnage (FR);
Mickael Bouyaud, Le Mans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 95 days.

(21) Appl. No.: 14/361,841

(22) PCT Filed: Dec. 5, 2012

(86) PCT No.: PCT/EP2012/074554
§ 371 (c)(1),
(2) Date: May 30, 2014

(87) PCT Pub. No.: WO2013/087489
PCT Pub. Date: Jun. 20, 2013

(65) Prior Publication Data
US 2014/0378084 A1    Dec. 25, 2014

Related U.S. Application Data

(60) Provisional application No. 61/585,766, filed on Jan. 12, 2012.

(30) Foreign Application Priority Data

Dec. 12, 2011 (EP) .................................... 11306640

(51) Int. Cl.
*H04M 11/04* (2006.01)
*H04W 52/02* (2009.01)
(Continued)

(52) U.S. Cl.
CPC ............ *H04W 52/0232* (2013.01); *H04W 4/22* (2013.01); *H04W 36/0094* (2013.01);
(Continued)

(58) Field of Classification Search
CPC ... H04W 84/045; H04W 36/14; H04W 36/30; H04W 36/32; H04W 48/02; H04W 36/04; H04W 36/08; H04W 48/18; H04W 76/007; H04W 12/08; H04W 4/22; H04W 4/001; H04W 4/00; H04W 12/06; H04W 48/04; H04W 8/18; H04W 36/06; H04W 36/24; H04W 36/26; H04W 36/0083
USPC ........... 455/436, 434, 418, 552.1, 422.1, 438, 455/433, 445, 404.1, 404.2, 435.1, 556.1; 370/331, 328, 329; 348/148
See application file for complete search history.

(56) References Cited

U.S. PATENT DOCUMENTS

2003/0202490 A1* 10/2003 Gunnarsson .......... H04L 1/0002
370/332
2007/0099603 A1* 5/2007 Castres ................ G10H 1/0008
455/418

(Continued)

FOREIGN PATENT DOCUMENTS

| GB | 2 413 737 A | 11/2005 |
| WO | 98/10617 A1 | 3/1998 |
| WO | 2007/019556 A1 | 2/2007 |

OTHER PUBLICATIONS

3rd Generation Partnership Project (3GPP); "3rd Generation Partnership Project; Technical Specification Group Radio Access Network; UE Procedures in Idle Mode and Procedures for Cell Reselection in Connected Mode (Release 1999)"; 3GPP TS 25.304 V3.4.0 (200-09) Technical Specification; Sep. 2000; pp. 1-42.

(Continued)

*Primary Examiner* — Fred Casca
(74) *Attorney, Agent, or Firm* — Patent Portfolio Builders PLLC

(57) ABSTRACT

Limited service state controller (30) for controlling activity of a mobile device (1) when the mobile device is in a limited service state, in which the mobile device camps on an acceptable serving cell of a cellular telecommunication network, the limited service state controller being configured to: get mobile device state information indicating that the mobile device is in the limited service state, get radio environment parameters related to a radio environment of the mobile device, and determine activity parameters to be set in the mobile device based on the mobile device state information and/or the radio environment parameters, for limiting the activity of the mobile device compared to the activity to be done when the mobile device is in a normal service state, while enabling access to an emergency service allowing to make an emergency call.

20 Claims, 2 Drawing Sheets

(51) Int. Cl.
*H04W 84/04* (2009.01)
*H04W 48/18* (2009.01)
*H04W 4/22* (2009.01)
*H04W 68/02* (2009.01)
*H04W 36/00* (2009.01)
*H04W 36/14* (2009.01)

(52) U.S. Cl.
CPC .......... *H04W48/18* (2013.01); *H04W 52/0212* (2013.01); *H04W 52/0216* (2013.01); *H04W 52/0251* (2013.01); *H04W 68/02* (2013.01); *H04W 84/045* (2013.01); *H04W 36/0083* (2013.01); *H04W 36/14* (2013.01)

(56) References Cited

U.S. PATENT DOCUMENTS

| | | | | |
|---|---|---|---|---|
| 2009/0298459 A1* | 12/2009 | Saini | .................. | H04W 76/007 455/404.1 |
| 2010/0255843 A1* | 10/2010 | Huang | .............. | H04W 52/0229 455/436 |
| 2013/0040697 A1* | 2/2013 | Ekici | .................... | H04W 48/18 455/552.1 |
| 2013/0084855 A1* | 4/2013 | Ekici | .................... | H04W 48/18 455/432.1 |

OTHER PUBLICATIONS

Global System for Mobile Communications (GSM), 3rd Generation Partnership Project (3GPP); "3rd Generation Partnership Project; Technical Specification Group GSM/EDGE Radio Access Network; Functions related to Mobile Station (MS) in idle mode and group receive mode (Release 8)"; 3GPP TS 43.022 V8.2.0 (2010-03) Technical Specification; Mar. 2010; pp. 1-24.

LTE, 3rd Generation Partnership Project (3GPP); "3rd Generation Partnership Project; Technical Specification Group Radio Access Network; Evolved Terrestrial Radio Access (E-UTRA); User Equipment (UE) procedures in idle mode (Release 8)"; 3GPP TS 36.304 V8.6.0 (2009-06) Technical Specification; Jun. 2009; pp. 1-30.

3rd Generation Partnership Project (3GPP); "3rd Generation Partnership Project; Technical Specification Group Radio Access Networks; Requirements for Support of Radio Resource Management (FDD) (Release 1999)"; 3GPP TS 25.133 V3.3.0 (2000-09) Technical Specification; Sep. 2000; pp. 1-92.

3rd Generation Partnership Project (3GPP); "3rd Generation Partnership Project; Technical Specification Group (TSG) RAN; Working Group 2 (WG2); RRC Protocol Specification"; TS 25.331 V1.5.0 (1999-09) Technical Specification; TSG-RP#5(99)468; TSG-RAN meeting #5; Oct. 6-8, 1999; pp. 1-218; Kyongju, Sweden.

International Search Report issued in corresponding International application No. PCT/EP2012/074554, date of mailing Jan. 18, 2013.

Written Opinion of the International Searching Authority issued in corresponding International application No. PCT/EP2012/074554, filing date of Dec. 12, 2011.

* cited by examiner

LIMITED SERVICE STATE CONTROL

TECHNICAL FIELD

The present invention relates to devices and methods for controlling activity of a mobile device when the mobile device is in a limited service state.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all, or even any, of the problems brought forward in this section.

A cellular telecommunications network comprises, for example, a set of Public Land Mobile Networks (PLMN). An available PLMN is a PLMN for which a mobile device has found at least one cell and can read its PLMN identity.

A suitable cell of a PLMN is a cell on which the mobile device may camp for normal services. For example, for a Universal Terrestrial Radio Access (UTRA) cell and for a Global System for Mobile Communications (GSM) cell, the criteria are defined in the 3G partnership project (3GPP) standardization Technical Specification (TS) 25.304 (for 3G), in TS 43.022 (for 2G), and in TS 36.304 (for LTE).

For camping on a cell, the mobile device typically has to choose a cell and complete a cell selection/reselection process.

However, there are some cases where the mobile device is unable to camp on a suitable cell. For example, when the mobile device cannot find a suitable cell to camp on (e.g. in a PLMN approved by the operator is used), when no SIM (Subscriber Identity Module) or USIM (UMTS SIM) is inserted in the mobile device, or when the location registration has failed.

In such a case, the mobile device may attempt to camp on an acceptable cell irrespective of the PLMN identity. An acceptable cell is a cell that satisfies certain conditions, e.g. as specified in 3GPP TS 25.304. In particular, an acceptable cell may be a cell allowing the mobile device to make an emergency call. The mobile device may then enter a limited service state, in which it can only attempt to make emergency calls.

The limited service state and the transition between limited service state and normal service state procedures are described by the 3GPP TS 25.304.

In particular, the standard description implies that a mobile device in the limited service state monitors a paging channel, meaning reading the Paging Indicator Channel, to be aware if the mobile device is paged, as described in 3GPP TS 25.133. Paging channel monitoring of the serving cell may, for example, be performed periodically every 2.56 s (if no USIM) or from 0.08 s to 5.12 s (if an International Mobile Subscriber Identity (IMSI) is available).

The standard description also implies that in the limited service state the mobile device should be able to make an emergency call. To achieve this, the mobile device must be, at least, on an acceptable cell. In case of mobility, an acceptable cell can vanish. It is up to the mobile device to scan the radio environment and define the most suitable acceptable cell. S (cell selection criterion) and R (cell-ranking criterion) are tools described in the standard to characterize the suitability criteria of a cell in term of power and quality reception. A mobile device in the limited service state should also try to recover PLMN by triggering periodic PLMN scans.

The standard description further implies that a mobile device in the limited service state monitors system information of the cells it camps on, meaning reading the system information contained in the broadcast channel (BCH), as described in 3GPP TS 25.331.

These activities involve power consumption.

There is a need for improved methods and devices for optimizing power consumption of a mobile device when it is not registered to a cellular telecommunications network.

SUMMARY

To address these needs, a first aspect of the present invention relates to a limited service state controller for controlling activity of a mobile device when the mobile device is in a limited service state, in which the mobile device camps on an acceptable serving cell of a cellular telecommunications network, the limited service state controller being configured to:
get mobile device state information indicating that the mobile device is in the limited service state,
get radio environment parameters related to a radio environment of the mobile device, and
determine activity parameters to be set in the mobile device based on the mobile device state information and/or the radio environment parameters, for limiting the activity of the mobile device compared to the activity to be done when the mobile device is in a normal service state, while enabling access to an emergency service allowing to make an emergency call.

Embodiments of this controller may aim at reducing activity of the mobile device when it is in the limited service state, while maintaining emergency service availability. This limitation may save power consumption, so autonomy of the mobile device may be improved.

The activity parameters may comprise serving parameters, which are processed in order to keep a serving cell synchronization and to get periodic measurement of a serving cell.

The activity parameters may comprise neighbor cells monitoring parameters, which are processed in order to reduce the activity to be done for cell reselection process compared to the cell reselection process in a normal service state, in which the mobile device camps on a suitable serving cell.

The neighbor cells monitoring parameters may be processed in order to reduce the number of neighbor cells monitored and/or the amount of monitoring activity for each monitored cell. The number of neighbor cells monitored may be determined based on measurements of the variation in radio conditions.

The activity parameters may include paging filtering parameters for filtering the paging channels reading, in order to limit the activity on the paging channel to the minimum required for cell synchronization.

The activity parameters may include system information filtering parameters for filtering the system information reading.

A second aspect of the present invention relates to a mobile device comprising a reception/transmission block, a modem, and a limited service state controller according to the first aspect.

A third aspect of the present invention relates to a method of data processing for controlling activity of a mobile device when the mobile device is in a limited service state, in which the mobile device camps on an acceptable serving cell of a cellular telecommunications network, the method comprising steps of:

getting mobile device state information indicating that the mobile device is in the limited service state, getting radio environment parameters related to a radio environment of the mobile device, and determining activity parameters to be set in the mobile device based on the mobile device state information and/or the radio environment parameters, for limiting the activity of the mobile device compared to the activity to be done when the mobile device is in a normal service state, while enabling access to an emergency service allowing a user to make an emergency call.

A fourth aspect of the present invention relates to a computer program product comprising a computer readable medium, having thereon a computer program comprising program instructions, the computer program being loadable into a data-processing unit and adapted to cause the data-processing unit to carry out the steps of the method according to the third aspect when the computer program is run by the data-processing unit.

In some embodiments, the third and fourth aspects of the invention may additionally have features identical with or corresponding to any of the various features as explained above for the first aspect of the invention.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Embodiments of the invention deal with the problem of optimizing power consumption of a mobile device when it is not registered to a cellular telecommunications network.

The cellular telecommunications network comprises for example a set of Public Land Mobile Networks (PLMN).

Figure 1:
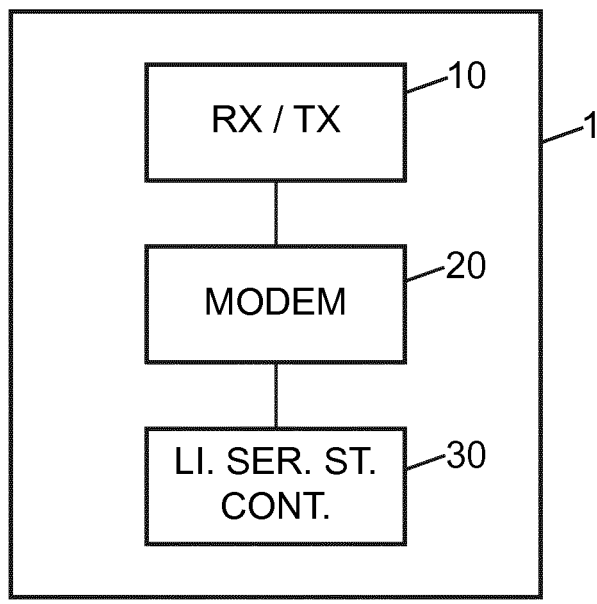
FIG. 1 is a schematic block diagram of a mobile device according to some embodiments of the invention.

FIG. 1 shows a mobile device 1, for example a mobile phone, according to embodiments of the invention. The mobile device 1 comprises a reception/transmission block 10, for example an antenna system, configured to receive and transmit signals.

The mobile device 1 further comprises a modem 20. For example, the modem 20 may comprise a listening block for listening to paging messages, a physical interface block for coupling the modem 20 with the reception/transmission block 10, a processing block for controlling other blocks of the modem 20, a cellular environment management block for selecting a cell in the environment of the mobile device 1, and a modem configuration block for configuring the modem 20.

The mobile device 1 is configured to choose a cell and to complete a cell selection/reselection process for camping on a suitable cell of an available PLMN. An available PLMN is a PLMN for which the mobile device 1 has found at least one cell and reads its PLMN identity. A suitable cell of a PLMN is a cell on which the mobile device 1 may camp. The mobile device 1 is then in a normal service state in which it can access a plurality of services, including voice and data services.

However, there are some cases where the mobile device 1 is unable to camp on a suitable cell. This may be due to the fact that a SIM (Subscriber Identity Module) or USIM (UMTS SIM) card of the mobile device 1 has been removed or is defective. This may also be due to a failure of the mobile device 1 to find a suitable cell, or to be able to register on an allowed PLMN (either his HPLMN or equivalent PLMN, or a roaming PLMN). Another good reason is that the operator does not offer a good coverage in the area the mobile device is used.

It is noted that SIM/USIM card may be replaced with other types of physical subscriber identity modules, or with a SIM/USIM software application executed in the mobile device 1, and/or with a virtual SIM/USIM which is "stolen" or "borrowed" from another device and is rendered accessible to the mobile device by way of an appropriate interface. Then, the mobile device 1 may be unable to camp on a suitable cell when no subscriber identity is detected.

When the mobile device 1 is unable to camp on a suitable cell, the mobile device 1 is configured to attempt to camp on an acceptable cell irrespective of the PLMN identity. An acceptable cell is a cell that satisfies certain conditions, for example, as specified in 3GPP TS 25.304. In particular, an acceptable cell may be a cell allowing the mobile device 1 to make an emergency call. The mobile device 1 then enters a limited service state, in which it can only access a part of the plurality of services, in particular an emergency service allowing a user to make emergency calls.

The mobile device 1 further comprises a limited service state controller 30 configured to control the mobile device activity when the mobile device 1 is in the limited service state.

More specifically, embodiments of the invention aim at optimizing power consumption by reducing activity related to some procedures performed by the mobile device 1 when the mobile device is in a limited service state, while maintaining the capability of the mobile device 1 to make an emergency call. In other words, embodiments of this invention aim at reducing the mobile device activity to the minimum required for emergency service.

The limited service state controller 30 is configured to get mobile device state information. The mobile device state information is related to the synchronization/registration of the mobile device 1 to the network.

For example, the mobile device state information may indicate whether the mobile device 1 is in a normal service state or in a limited service state. The mobile device state information may further indicate whether a SIM/USIM is detected, and/or whether the mobile device 1 is registered to a network.

The limited service state controller 30 is further configured to get radio environment parameters. For example, the radio environment parameters may be related to the cells that can be suitable or acceptable.

The radio environment parameters may help to characterize mobility condition of the mobile device 1. In particular, the radio environment parameters may comprise:

a parameter related to a number of neighbor cells and/or variation of their reception strength, a parameter related to a speed of the mobile device 1. This parameter may be characterized by Doppler spread or by a variation speed of the reception strength of the serving cell and the neighborhood. An example of this last characterization is the time to vary of 3 dB.

a parameter related to a type of environment, urban or country. This parameter may be characterized by the multi path, i.e. the number of propagation paths that are used by radio wave from cell to mobile device 1. This number is dependent of the reflector, refractors, their numbers and their distances (mountain, building, car, truck, indoor).

The limited service state controller 30 is further configured to process updated activity parameters to be set in the mobile device 1. These updated activity parameters are processed based on the mobile device state information and/or the radio environment parameters for limiting the mobile device's activity when the mobile device 1 is in a limited service state, while ensuring emergency service.

For example, when the speed of the mobile device 1 is determined to be null, the activity parameters may be processed to stop monitoring neighbor cell, i.e. to stop measuring their strength and trying to detect new cells.

The activity parameters may include serving parameters, neighbor cells monitoring parameters, and periodicity parameters.

In a limited service state, the mobile device 1 has to camp on an acceptable cell to be able to make an emergency call. The acceptable cell must be a cell with sufficient power level, synchronization to the network, and a minimum set of system information to make an emergency call. Thus, the activity parameters are processed in order to keep the serving cell synchronization and get periodic measurement of the serving cell level to check if it remains acceptable for limited services.

The emulation of the DRX (Discontinuous Reception) period may be extended to the maximum possible to ensure this activity limitation as soon as the mobile device is in a limited service state, and whatever the cause (no SIM, no registration to network, etc.). Consequently, the DRX activity can be reduced, and the sleep time is enhanced.

Moreover, when in a limited service state, the goal is to camp on a good enough cell, which does not necessarily have to be the best one, but may be any cell having the ability to provide the emergency call service. Therefore, the activity parameters may be processed to control a specific behavior for limited service reselection, in order to limit the activity to be done. For example, 3GPP imposes a refresh period of 200 ms. The specific behavior may comprise extending the refresh period.

In particular, activity parameters may be processed to update the criteria and the threshold for neighbor cells activity (Sinter-freq, Sintra-freq, Sinter-rat). Activity parameters may further be processed to select specific PLMN, and to update the number of neighbor cells monitored. For example, the number of neighbor cells monitored may be limited to some of them, not necessarily neighbors of camped cell, but any other PLMN.

The limited service state controller 30 may further be configured to perform measurements of variations in radio conditions and to use these measurements to process the activity parameters, for example by decreasing/increasing the amount of monitoring of the neighbor cells based on the measurements, and/or for decreasing/increasing the amount of detection attempts of a detected set based on the measurements.

The activity parameters may further include paging filtering parameters for filtering paging channels reading. The paging filtering parameters may, for instance, be processed to remove paging read for a MT call. In a limited service state, no paging messages are sent by the network since the mobile device 1 is not registered and therefore not known by the network. Therefore, no paging decoding activity is needed. The activity on the paging channel can be limited to a minimum required for cell synchronization.

The activity parameters further include system information filtering parameters for filtering the system information (BCCH) reading. The system information filtering parameters may, for instance, be processed to keep only system information mandatory for emergency call.

Some information within the System Information (SI in 2G, SIB in 3G) are not fully useful for emergency calls, because they may be linked to some service not used in a limited service state. Therefore, the activity parameters may be processed to read only the mandatory ones, for saving scheduling time.

However, with some technologies, for example in 3G, a regular SI update check is needed to keep updated with the right parameters. For example, the Management Information Base (MIB) may have to be checked periodically. A MIB update may be either known through a specific paging indication from the network, either MIB as a validity of 6 hours. Thus, in a limited service state, instead of permanent MIB update monitoring, the activity parameters may be processed to set a periodically update monitoring.

The limited service state controller 30 is further configured to set the processed activity parameters in the mobile device 1.

Embodiments of the invention thus aim at reducing activity of the mobile device 1 when it is in a limited service state, while maintaining emergency service availability. This limitation saves power consumption, so autonomy of the mobile device 1 is improved.

In some embodiments, the modem 20 may be a multi SIM modem, for example a Dual SIM Dual Standby (DSDS) modem. In such embodiments, due to physical limitations of the reception/transmission block 10 for example, the modem 20 may only be capable of handling one on-going call at the same time. In particular, a multi SIM modem 20 generally cannot simultaneously receive a plurality of paging messages used to handle calls in the respective cells. This event, called paging collision or missed paging, may typically arise when a first paging message sent by a first cell and a second paging message sent by a second cell are emitted almost simultaneously or when the time interval between the sending of the first page and the second page is too short for the modem to receive correctly both pages. Then, at least one among the first and the second pages gets dropped. The limited service state controller 30 further aims at reducing collisions between the activities of the two subscriptions, in particular due to the paging filtering parameters processing.

Figure 2:
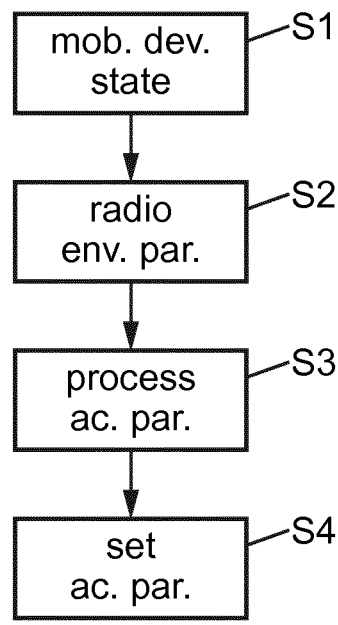
FIG. 2 and FIG. 3 are flow charts showing steps of a method for controlling activity of a mobile device when the mobile device is in a limited service state, according to some embodiments of the invention.
Figure 3:
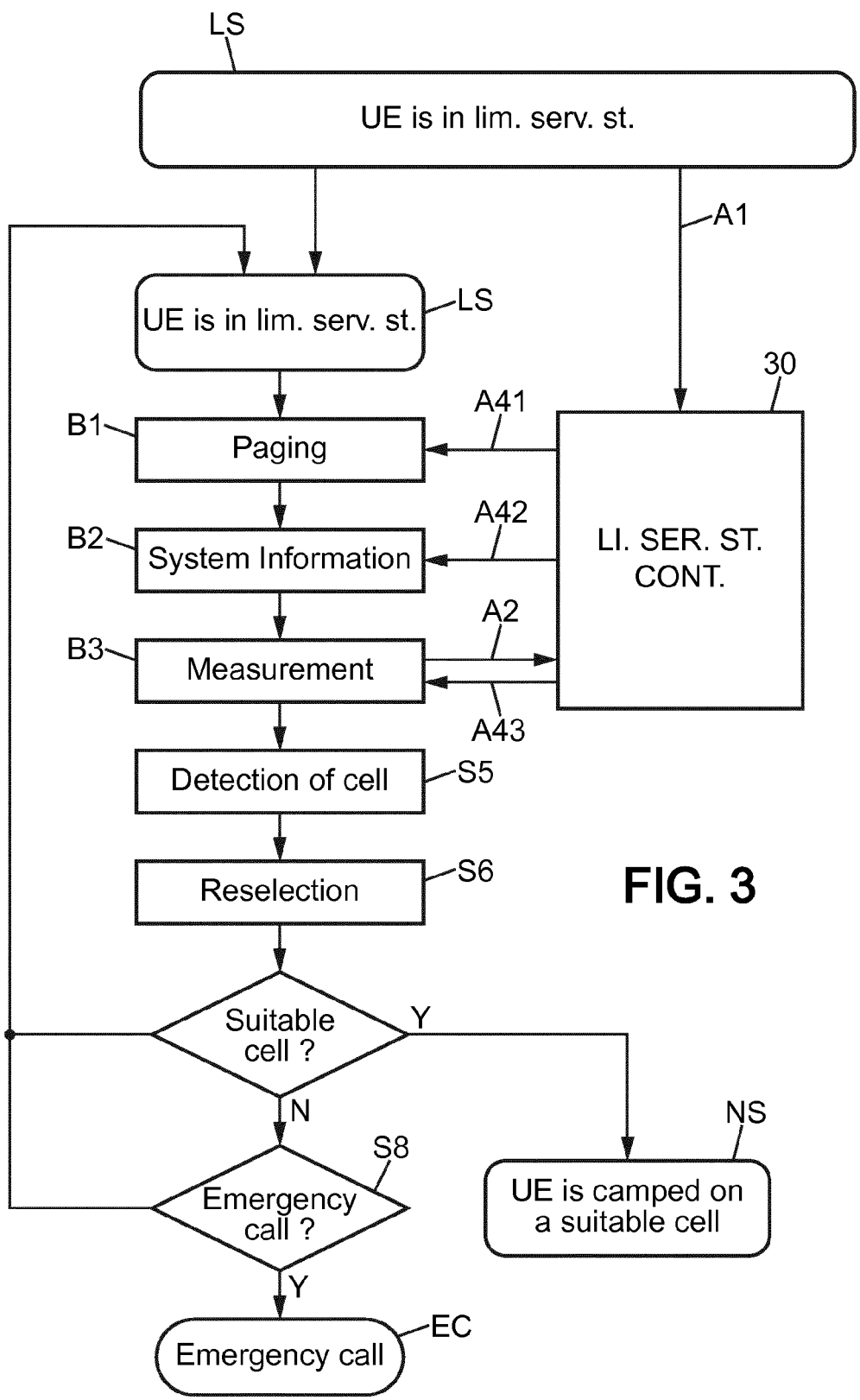

FIG. 2 and FIG. 3 represents steps of a method for controlling activity of a mobile device when the mobile device is in a limited service state, according to some embodiments of the invention.

We assume the mobile device 1 is initially in a limited service state LS.

In step S1, the limited service state controller 30 gets mobile device state information indicating that the mobile device 1 is in the limited service state. In other words, the mobile device 1 is camped on an acceptable cell but not on a suitable cell. Step S1 is symbolized by arrow A1 in FIG. 3.

In step S2, the limited service state controller 30 gets radio environment parameters related to a radio environment of the mobile device. Step S2 is symbolized by arrow A2 in FIG. 3.

In step S3, the limited service state controller 30 processes, based on mobile device state information and/or radio environment parameters, activity parameters to be set in the mobile device in the limited service state, for limiting the mobile device activity to the accessibility of an emergency service to make an emergency call.

The processing may comprise serving parameters processing in order to keep the serving cell synchronization and to get periodic measurement of a serving cell level.

The processing may comprise neighbor cells monitoring parameters processing in order to reduce the activity to be done for cell reselection process compared to the cell reselection process in a normal service state, in which the mobile device camps on a suitable serving cell. In particular, the neighbor cells monitoring parameters may be processed in order to reduce the number of neighbor cells monitored. The number of neighbor cells monitored may be determined based on the measurements of variations in radio conditions.

The processing may include paging filtering parameters processing for filtering paging channels reading, in order to limit the activity on the paging channel to a minimum required for cell synchronization. Paging filtering parameters are symbolized by block B1 in FIG. 3.

The processing may include system information filtering parameters processing for filtering system information reading. System information filtering parameters are symbolized by block B2 in FIG. 3.

The processing may include measurement parameters processing, for example for extending the refresh period. System information filtering parameters are symbolized by block B3 in FIG. 3.

In step S4, the limited service state controller 30 sets the processed activity parameters in the mobile device 1. Step S4 is symbolized by arrows A41, A42 and A43 in FIG. 3.

As represented in FIG. 3, the method for controlling activity of a mobile device may further comprise a step S5 of detection of a cell out of detection set, and a step S6 of performing a reselection procedure.

In step S7, the mobile device 1 tests whether a suitable cell may be selected. When a suitable cell may be selected, the mobile device 1 then enters a normal service state NS. When no suitable cell may be selected, the method goes to step S8.

In step S8, the mobile device 1 tests whether it has to raise an emergency call. In case of an emergency call, the emergency call is handled, as symbolized by block EC. If not, the method returns to block LS.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed may be combined without departing from the scope of the invention.

The invention claimed is:

1. A limited service state controller in a mobile device and for controlling activity of the mobile device when the mobile device is in a limited service state, in which the mobile device camps on an acceptable serving cell of a cellular telecommunications network and is able to make an emergency call, the limited service state controller being configured to:
   get mobile device state information indicating that the mobile device is in the limited service state,
   get radio environment parameters related to a radio environment of the mobile device which is in the limited service state,
   determine activity parameters to be set in the mobile device based on the mobile device state information which indicates the mobile device is in the limited service state and based on the radio environment parameters, and
   set the determined activity parameters in the mobile device by the limited service state controller,
   wherein the activity parameters limit the activity of the mobile device in the limited service state to reduce power consumption of the mobile device compared to the activity of the mobile device allowed in a normal service state,
   wherein the radio environment parameters comprise two or more of the following: a parameter related to a number of neighbor cells, a parameter related to a speed of mobile device and a parameter related to a geographical type of environment, and
   wherein the activity parameters comprise at least one of the following: serving parameters, neighbour cells monitoring parameters, paging filtering parameters, and system information filtering parameters.

2. The limited service state controller according to claim 1, wherein the activity parameters comprise serving parameters, which are processed in order to keep a serving cell synchronization and to get a periodic measurement of a serving cell.

3. The limited service state controller according to claim 1, wherein the activity parameters comprise neighbor cells monitoring parameters, which are processed in order to reduce the activity to be done for a cell reselection process in the limited service state compared to a cell reselection process in a normal service state, in which the mobile device camps on a suitable serving cell.

4. The limited service state controller according to claim 3, wherein the neighbor cells monitoring parameters are processed in order to reduce the number of neighbor cells monitored and/or the amount of monitoring activity for each monitored cell.

5. The limited service state controller according to claim 4, wherein the number of neighbor cells monitored is determined based on measurements of radio condition variation.

6. The limited service state controller according to claim 1, wherein the activity parameters include paging filtering parameters for filtering paging channels reading, in order to limit the activity on the paging channel to a minimum required for cell synchronization.

7. The limited service state controller according to claim 1, wherein the activity parameters include system information filtering parameters for filtering system information reading.

8. A mobile device comprising a reception/transmission block, a modem, and the limited service state controller according to claim 1.

9. A method for controlling activity of a mobile device, by a limited service state controller in the mobile device, when the mobile device is in a limited service state, in which the mobile device camps on an acceptable serving cell of a cellular telecommunications network and is able to make an emergency call, the limited service state controller performing the following steps:
  getting mobile device state information indicating that the mobile device is in the limited service state,
  getting radio environment parameters related to a radio environment of the mobile device which is in the limited service state,
  determining activity parameters to be set in the mobile device based on the mobile device state information which indicates the mobile device is in the limited service state and based on the radio environment parameters, and
  setting the determined activity parameters in the mobile device by the limited service state controller,
  wherein the activity parameters limit the activity of the mobile device in the limited service state to reduce power consumption of the mobile device compared to the activity of the mobile device allowed in a normal service state,
  wherein the radio environment parameters comprise two or more of the following: a parameter related to a number of neighbor cells, a parameter related to a speed of mobile device and a parameter related to a geographical type of environment, and
  wherein the activity parameters comprise at least one of the following: serving parameters, neighbour cells monitoring parameters, paging filtering parameters, and system information filtering parameters.

10. The method according to claim 9, wherein the activity parameters comprise serving parameters, which are processed in order to keep the serving cell synchronization and to get a periodic measurement of a serving cell.

11. The method according to claim 9, wherein the activity parameters comprise neighbor cells monitoring parameters, which are processed in order to reduce the activity of a cell reselection process in the limited service state compared to the activity of a cell reselection process in a normal service state, in which the mobile device camps on a suitable serving cell.

12. The method according to claim 9, wherein the activity parameters include paging filtering parameters for filtering paging channels reading, in order to limit the activity on a paging channel to a minimum required for cell synchronization.

13. The method according to claim 9, wherein the activity parameters include system information filtering parameters for filtering system information reading.

14. A non-transitory computer readable medium embodied in a mobile device, for controlling activity of the mobile device when the mobile device is in a limited service state, in which the mobile device camps on an acceptable serving cell of a cellular telecommunications network and is able to make an emergency call,
  wherein said non-transitory computer readable medium comprises a computer program comprising program instructions, the computer program being executable by a processor on the non-transitory computer readable medium to perform the following steps:
    getting mobile device state information indicating that the mobile device is in the limited service state,
    getting radio environment parameters related to a radio environment of the mobile device which is in the limited service state,
    determining activity parameters to be set in the mobile device based on the mobile device state information which indicates the mobile device is in the limited service state and based on the radio environment parameters, and
    setting the determined activity parameters in the mobile device by the limited service state controller,
    wherein the activity parameters limit the activity of the mobile device in the limited service state to reduce power consumption of the mobile device compared to the activity of the mobile device allowed in a normal service state,
    wherein the radio environment parameters comprise two or more of the following: a parameter related to a number of neighbor cells, a parameter related to a speed of mobile device and a parameter related to a geographical type of environment, and
    wherein the activity parameters comprise at least one of the following: serving parameters, neighbour cells monitoring parameters, paging filtering parameters, and system information filtering parameters.

15. The non-transitory computer readable medium according to claim 14, wherein the activity parameters comprise serving parameters, which are processed in order to keep a serving cell synchronization and to get a periodic measurement of a serving cell.

16. The non-transitory computer readable medium according to claim 14, wherein the activity parameters comprise neighbor cells monitoring parameters, which are processed in order to reduce the activity to be done for a cell reselection process in the limited service state compared to a cell reselection process in a normal service state, in which the mobile device camps on a suitable serving cell.

17. The non-transitory computer readable medium according to claim 16, wherein the neighbor cells monitoring parameters are processed in order to reduce the number of neighbor cells monitored and/or the amount of monitoring activity for each monitored cell.

18. The non-transitory computer readable medium according to claim 17, wherein the number of neighbor cells monitored is determined based on measurements of radio condition variation.

19. The non-transitory computer readable medium according to claim 14, wherein the activity parameters include paging filtering parameters for filtering paging channels reading, in order to limit the activity on the paging channel to a minimum required for cell synchronization.

20. The non-transitory computer readable medium according to claim 14, wherein the activity parameters include system information filtering parameters for filtering system information reading.

* * * * *